United States Patent [19]

Parker et al.

[11] Patent Number: 4,468,302
[45] Date of Patent: Aug. 28, 1984

[54] PROCESSING COPPER-NICKEL MATTE

[75] Inventors: Peter D. Parker, Brooklyn, N.Y.; Eric L. Frueh, New Brunswick, N.J.

[73] Assignee: Amax Inc., Greenwich, Conn.

[21] Appl. No.: 411,934

[22] Filed: Aug. 26, 1982

[51] Int. Cl.³ .............................................. C25C 1/12
[52] U.S. Cl. .................... 204/108; 75/101 R; 75/109; 75/115; 75/117; 75/119; 75/74
[58] Field of Search .............. 204/108; 75/101 R, 109, 75/115, 117, 119, 74

[56] References Cited

U.S. PATENT DOCUMENTS

| | | | |
|---|---|---|---|
| 814,049 | 3/1906 | Johnson | 204/108 |
| 882,075 | 3/1908 | Neil | 204/108 |
| 1,844,937 | 2/1932 | Hybinette | 423/42 |
| 3,741,752 | 6/1973 | Evans et al. | 75/101 |
| 4,093,526 | 6/1978 | Blanco et al. | 204/104 |
| 4,256,553 | 3/1981 | Baczek et al. | 75/115 |

Primary Examiner—R. L. Andrews
Attorney, Agent, or Firm—Michael A. Ciomek; Donald T. Black

[57] ABSTRACT

Feed material, such as matte, containing nickel and copper values and sulfur, is leached with an acidic copper sulfate solution to dissolve nickel, cobalt and other metal values and to cement copper from solution. The leach residue is roasted, and a selected quantity of copper is leached from the resulting calcine with sulfuric acid to form a copper sulfate electrolyte. The rest of the calcine is smelted to form copper-nickel anodes which are electrorefined in the copper sulfate electrolyte, thereby producing a cathodic copper deposit and a nickel-enriched, copper sulfate electrolyte which is recycled for leaching additional feed material.

10 Claims, 1 Drawing Figure

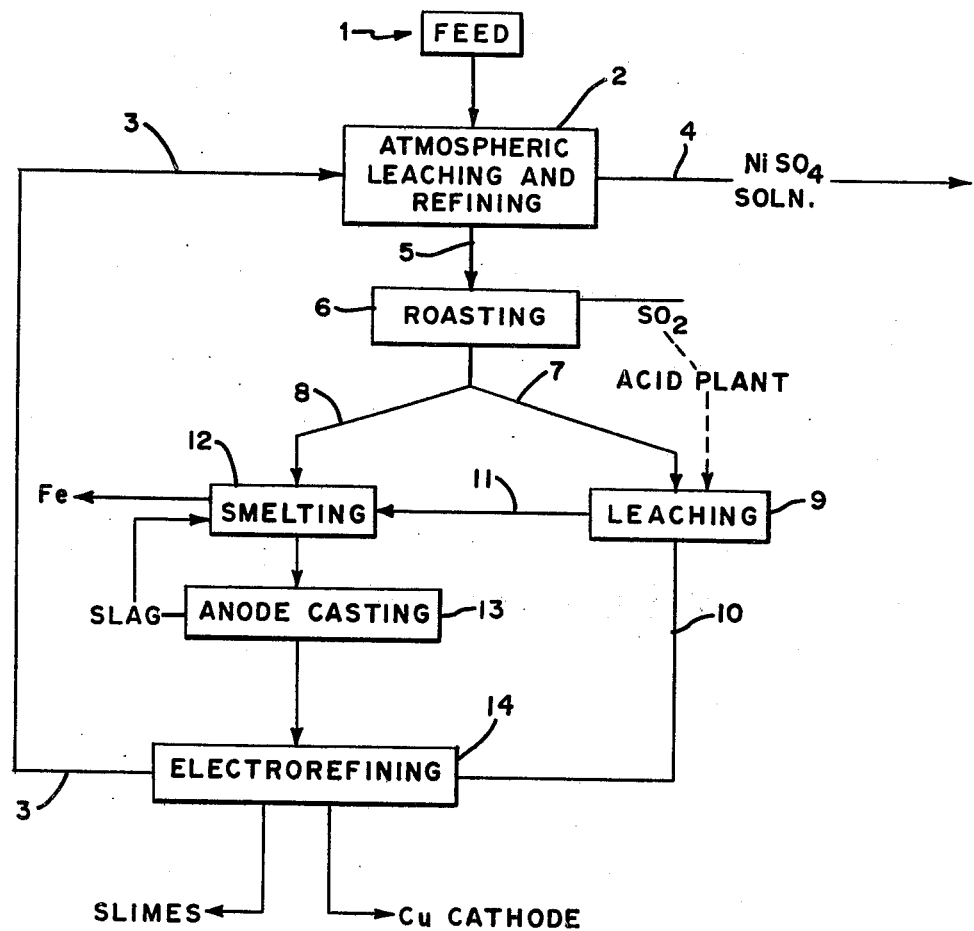

PROCESSING COPPER-NICKEL MATTE

BACKGROUND OF THE INVENTION

1. Field of the Invention

The present invention relates to the refining of sulfur-bearing materials containing quantities of nickel and copper values, such as nickel-copper-sulfur concentrates and in particular nickel-copper matte, by hydrometallurgical treatment.

2. Description of the Prior Art

Hydrometallurgical processes for refining copper-nickel-sulfur concentrates and mattes are known in which the desired metal values are dissolved in one or more leaching stages, and copper is eventually recovered electrolytically. These processes generally have one or more disadvantages, such as the production of by-products which contain sufficient amounts of copper and/or nickel that further treatment of the by-products is necessary for recovery of the nonferrous metal values. Another disadvantage is that these processes consume energy in amounts that, though relatively significant, have heretofore been considered necessary.

For instance, U.S. Pat. No. 814,049 discloses a process in which copper-nickel matte having a copper:nickel ratio of, for instance, 1:1 is leached in sulfuric acid to form a nickel sulfate solution, hydrogen sulfide gas, and a leach residue comprising sulfides of copper and nickel. The residue is then roasted to form a mixture of copper and nickel oxides, and the oxide mixture is leached with sulfuric acid to form a solution containing, for instance, 9% copper sulfate and 1% nickel sulfate. This solution is then subjected to electrowinning to recover a cathodic copper deposit, and the electrolyte is recycled to the oxide leaching stage. The electrolyte is periodically withdrawn, subjected to further electrowinning to lower the copper content to about 0.4%, and then recycled to the matte leaching stage where the residual copper reacts with hydrogen sulfide and precipitates as copper sulfide. This process presents the drawback that leaching the copper-nickel oxide leaves substantial amounts of nickel in the leach residue which would therefore require additional treatment not described in the patent to recover the nickel. In addition, the cathodic copper deposit produced in the electrowinning step in which the copper content of the electrolyte is lowered to 0.4% copper would be of poor quality and might have to be refined further to separate the copper and nickel into acceptably pure products.

U.S. Pat. No. 882,075 discloses a process for treating copper-nickel matte in which all of the matte is initially roasted, and the entire quantity of roasted material is smelted to produce a copper-nickel alloy. A portion of the alloy is cast into anodes, and the remaining portion is dissolved in sulfuric acid to form a copper sulfate-nickel sulfate solution. The copper-nickel anodes are electrorefined in the copper sulfate-nickel sulfate solution to form a cathodic copper deposit and a nickel-enriched electrolyte. This process has the drawback that it cannot produce both a high-quality cathodic copper deposit and a nickel sulfate solution substantially purified of copper sulfate, without further treatment of either the deposit or the solution; continuing electrolysis to the point that copper is substantially removed from solution produces a cathodic deposit of unacceptable quality.

U.S. Pat. No. 1,844,937 discloses another process in which all the copper-nickel matte fed to the process is initially roasted. The roasted material is divided into two portions. One portion is smelted to produce copper-nickel anodes, and the other portion is leached with sulfuric acid to form a copper sulfate solution and a copper-nickel residue. The copper-nickel anodes are electrorefined in the copper sulfate solution to produce a cathodic copper product and a nickel-enriched electrolyte. The copper-nickel residue is smelted separately to form anodes which are electrolyzed in the nickel-enriched electrolyte in order to further enrich the electrolyte in nickel and to deplete its copper content to about 5 gpl. This process has the drawback that the cathodic copper deposit produced in the latter electrolysis includes a substantial portion of low-grade copper which must be subjected to further refining in order to provide copper of commercially acceptable purity.

SUMMARY OF THE INVENTION

Generally stated, the present invention comprises a process for refining a sulfur-containing, copper-containing concentrate, which also contains at least one metal less noble than copper, at least about 10 wt. % of which is in an acid-soluble form, and the (nickel plus cobalt) content of which is at least about 80 wt. %, comprising (a) providing a slurry of said concentrate in particulate form in a copper-containing sulfuric acid leaching solution, (b) subjecting said slurry to a first stage leaching and refining step at atmospheric pressure and a temperature ranging from about 40° to about 95° C. to effect the simultaneous dissolution of metal less noble than copper and cementation of substantial amounts of copper from said solution, (c) continuing said leaching to a terminal pH of over about 4 to refine said solution by further rejecting copper and impurities therefrom by hydrolysis and provide a purified sulfate solution of metal less noble than copper and a first stage atmospheric leach residue containing undissolved metal and sulfur compounds, and impurities, (d) separating said purified sulfate solution from said first stage atmospheric leach residue for recovery of said metal less noble than copper, (e) roasting the first stage atmospheric leach residue to form a calcine containing metal values in oxidic form and containing less than about 1 wt. % sulfur, (f) leaching at least a portion of the calcine with sulfuric acid to produce a copper sulfate solution containing an amount of copper at least equal to the sum of the amount of copper in the solution withdrawn in step (k) plus an amount electrochemically equivalent to the total amount of metal less noble than copper contained in the anode formed in step (m), and a second leach residue, (g) separating the copper sulfate solution formed in step (f) from the second leach residue, (h) mixing together the second leach residue with any unleached portion of the calcine, (i) smelting the mixture formed in step (h) to form a metallic alloy of copper and metal less noble than copper which comprises at least about 20 wt. % copper, (j) casting the alloy formed in step (i) into an anode, (k) establishing an electrolytic cell comprising the copper sulfate solution formed in step (g) having immersed therein the anode formed in step (j) and a cathode, (l) applying between the anode and the cathode in said electrolytic cell a voltage effective to dissolve the anode and to preferentially deposit copper onto the cathode, whereby the copper sulfate solution becomes enriched in metal less noble than copper and depleted of copper, (m) withdrawing said copper-depleted solution from the electrolytic cell while said solution contains sufficient copper that the cathodic copper deposit formed in step (1) comprises at least about 99% copper, and (n) recycling said withdrawn copper-depleted solution to step (a).

DETAILED DESCRIPTION OF THE INVENTION

The present process is directed to the refining of a wide variety of sulfur-containing, copper- and nickel-bearing materials including semi-metallic nickel-copper matte and concentrates, which may also include quantities of metallic nickel, copper, and alloys, mixed sulfides of copper and nickel, and plant by-products such as off-grade metallic products and metallic oxides, hydroxides and sulfates. Besides Ni, the feed material will generally contain appreciable amounts of other metals less noble than copper, i.e. metals which are electrolytically dissolvable from an anode under the electrolysis conditions described herein for the electrorefining of copper from the anode formed in stage 13 described below, principal among which are cobalt, bismuth, antimony and arsenic. The term "nickel" used herein should be understood to mean not only the element Ni but also other metals less noble than copper. Of the metal values in the feed material that are less noble than copper, (Ni plus Co) will generally comprise at least about 80 wt. % or even over about 90 wt. %.

The feed material should contain sufficient nickel in an acid-soluble metallic form to cement out substantial amounts of dissolved copper from recycle process solutions. Advantageously, the feed material should contain an amount of acid-soluble metallic nickel corresponding to at least about 10%, more advantageously at least about 20%, or ranging from about 40% up to about 100%, of the total nickel present. For example, in mattes containing Ni as $Ni_3S_2$, which is deemed to be equivalent to 2NiS.Ni, the amount of acid-soluble metallic Ni is about 33% of the total Ni present in the compound.

Besides nickel, the feed material also contains copper, in metallic and/or compound form. Generally, the amount of copper present in matte fed to the process should correspond to a copper-to-nickel weight ratio of at least about 0.5, and more advantageously at least about 0.75, to provide satisfactory copper recovery in the subsequent refining step consistent with a readily achievable degree of nickel extraction in the first leaching stage described below. Mattes having lower copper-to-nickel weight ratios can be preliminarily treated to raise that ratio by, for example, leaching the matte under oxidizing conditions with sulfuric acid or a copper sulfate-sulfuric acid solution. Where the feed material contains sufficient amounts of acidsoluble nickel that more than about 60% of the nickel can be extracted in the first leach stage, feed material having copper-to-nickel ratios as low as 0.1:1 or lower can be processed.

The feed material can also contain amounts of other non-ferrous metal values particularly including precious metals, selenium and tellurium. In addition, the feed material can contain iron, in amounts generally ranging up to about 5 wt. %.

Referring to the Figure, the feed material 1 is reacted in atmospheric leaching and refining stage 2 with recycled solution 3, which is drawn from refining stage 14 and which comprises an aqueous acidic solution containing copper sulfate, nickel sulfate, and an amount of free sulfuric acid generally higher than about 40 gpl and more frequently above about 50 gpl. The pH of solution 3 is generally less than 1. In stage 2, substantial amounts of nickel are leached from the feed material by reaction with sulfuric acid and with dissolved copper ions. Simultaneously, substantial amounts of copper are cemented from solution, thereby providing a refined nickel sulfate solution 4. The relative proportions of feed material 1 and solution 3 are selected to achieve the desired degree of extraction of acid-soluble nickel from feed material 1, consistent with the desired purity of the nickel sulfate solution 4. In order to minimize the need for further purification treatment of solution 4, it is advantageous in stage 2 to maximize the extraction of nickel from feed material 1 while minimizing the concentration of other dissolved metals in solution 4.

The atmospheric leaching and refining in stage 2 can be carried out by comminuting the feed material 1 and slurrying it, generally at a pulp density of about 5% to about 25% solids by weight, in an appropriate quantity of the copper-containing sulfuric acid solution described above. The slurry is subjected to leaching and refining at atmospheric pressure and a temperature of about 40° C. to about 95° C., preferably from about 60° C. to about 85° C., for a length of time sufficient to dissolve substantial amounts of nickel as nickel sulfate and to cement out substantial amounts of copper. Leaching is advantageously continued to a terminal pH of over about 4 to refine and purify the solution by further rejecting copper and other impurities (e.g., arsenic, antimony and bismuth) by hydrolysis therefrom and to provide a first leach residue containing undissolved nickel and copper, together with impurities. Attaining this terminal pH is facilitated by aerating the slurry. Providing a terminal pH of at least about 4 affords the added advantage that the leach residue is less likely to exhibit undesirable agglomeration when it is subsequently roasted.

Following leaching and refining in stage 2, the slurry is filtered to recover purified nickel sulfate solution 4 and first leach residue 5. Nickel sulfate solution 4 generally contains at least about 25 gpl to about 50 gpl, or even over about 100 gpl, nickel sulfate, and less than about 2 gpl copper sulfate. Solution 4 can be treated by conventional means to produce commercially pure nickel sulfate crystals or metallic nickel.

First leach residue 5 generally has a copper:nickel weight ratio of about 1 to about 5. Residue 5 is roasted in roasting stage 6 under oxidizing conditions to drive off the sulfur from the residue as sulfur dioxide, and to form a calcine containing the copper and nickel values of the residue in oxidic form. Roasting can be carried out in any conventional manner, such as in a hearth-type or fluidized-bed roaster. Advantageously, the off-gas produced in stage 6 is scrubbed, to remove sulfur dioxide and to recover relatively volatile by-products such as selenium. The sulfur dioxide can be converted to sulfuric acid and used in the leaching stage described in the next paragraph.

The calcine is leached to produce a copper sulfate solution 10 having a composition meeting the criteria described below. The entire calcine can be leached with an amount of sulfuric acid calculated to dissolve only the desired quantity of copper, thereby requiring that the entire remaining portion of the calcine be dewatered before it can be treated further. In the advantageous embodiment shown in the Figure, however, such extra steps can be avoided by selecting a first calcine portion 7 to be leached, leaving a second calcine portion 8 that is not leached. Selecting a separate calcine portion 7 also allows addition of an amount of sulfuric acid above the stoichiometric requirement; this aids dissolution kinetics and lets the operator adjust the overal sulfuric acid balance in but one stage.

First calcine portion 7 should contain sufficient copper to permit the formation in leaching stage 9 of copper sulfate solution 10. Solution 10 must contain an amount of copper at least equal to the sum of the amount of copper in recycled solution 3 drawn from refining stage 14, plus an amount of copper electrolytically equivalent to the amount of nickel (including all other electrolytically dissolvable metals, as pointed out above) reporting to anode casting stage 13 described below. The dissolution of excessive amounts of copper in stage 9 should be avoided because the added copper is not recovered as product, merely adds to the recycling load, and reduces flexibility in the operation of atmospheric leaching and refining stage 2. It will be recognized that occasionally it may be necessary to leach all or substantially all of the calcine in order to obtain sufficient copper in solution 10.

Leaching can be carried out in stage 9 by slurrying the first calcine portion 7, containing the desired amount of copper, in particulate form in sulfuric acid at atmospheric pressure with simultaneous aeration at a temperature generally ranging between about 40° C. and about 90° C. The resultant copper sulfate solution 10 contains generally about 20 gpl to about 90 gpl copper and less than about 20 gpl nickel. Solution 10 should also contain an amount of free sulfuric acid, generally ranging from about 50 gpl to about 150 gpl. Unleached copper and nickel values, and other insoluble impurities form second leach residue 11, which is filtered from solution 10, and dewatered to a water content of less than about 20 wt. %.

Second leach residue 11 is then mixed in any suitable manner with any unleached calcine which, as noted previously, is depicted in the Figure as second calcine portion 8. The mixture is then smelted in smelting stage 12 under conditions effective to form a fully reduced metallic copper-nickel alloy. Smelting can be carried out in stage 12 in any conventional manner, for instance by placing the mixture in an electric furnace together with an amount of coke comprising about 125% by weight of the stiochiometric amount for reduction of all metallic oxides to metal, and smelting the mixture at about 1550° C. Smelting should be carried out so as to maximize the recovery of copper, nickel and other nonferrous metal values in the copper-nickel alloy, while maximizing the removal of iron in a smelter slag residue which can be discarded. The resultant copper-nickel alloy should comprise at least enough copper that an anode formed of the alloy will dissolve readily in stage 14. To this end, the alloy should contain at least about 20 wt. % copper, and more advantageously at least about 40 wt. % copper. If there is not sufficient copper in the feed material to stage 12, for instance, where a high proportion of copper is leached into solution in leaching stage 9, a suitable amount of copper scrap can be added to stage 12 to adjust the copper content of the alloy. The copper-nickel alloy is then cast into an anode in stage 13.

In an advantageous embodiment of the invention, anode 13 is electrorefined in stage 14 in an electrolytic cell in the following manner. The anode 13 and a corresponding suitable cathode, such as a copper starter sheet, are suspended in a conventional electrolytic tank to which copper sulfate solution 10 is fed and from which an equal volume of recycled solution 3 is withdrawn. A potential is applied between the anode and cathode which is effective to dissolve the anode and preferentially deposit copper on the cathode. A voltage of about 0.1 volts to about 1.0 volts, and more advantageously about 0.5 to about 0.7 volts, is satisfactory. As electrolysis proceeds, copper and nickel (e.g., Ni, Bi, Sb, As, Co) are electrochemically dissolved into the electrolyte. The electrochemical dissolution of copper from the anode causes an equal amount of copper to deposit at the cathode. In addition, the electrochemical dissolution of metal other than copper from the anode causes an additional amount of copper to deposit, equivalent for equivalent, at the cathode, but such other metals do not themselves deposit at the cathode. Consequently, electrolysis of the anode causes the electrolyte to become enriched in nickel and depleted of copper. The noble metal values in the anode, such as precious metals, selenium and tellurium, collect on the bottom of the electrolytic cell as a solid anode slimes product.

Electrorefining in stage 14 should be carried out so that the copper concentration of recycled solution 3 withdrawn from the cell, and therefore of the electrolyte within the cell, remains high enough that the cathodic copper deposit is of good physical quality and comprises at least about 99% and more advantageously at least about 99.9% copper. To this end, the copper concentration of recycled solution 3 withdrawn from stage 14 should be at least about 15 gpl, and more advantageously at least about 20 gpl. This objective can be achieved by providing an appropriately elevated copper concentration in solution 10 as described above, to satisfy the requirement for maintaining cathode purity and to supply the copper plated out by dissolution of nickel from the anode. The nickel content of recycled solution 3 is generally about 20 gpl to about 50 gpl, and to avoid contaminating the cathode should generally not exceed about 70 gpl. The anode slimes can be periodically removed from the bottom of the electrolytic tank and treated to recover separately its various metal components. Solution 3, which as mentioned above contains copper sulfate, nickel sulfate, and free sulfuric acid, is recycled to atmospheric leaching and refining stage 2 for reaction with additional copper- and nickel-bearing feed material.

The foregoing description comprises the process of the present invention operating as an essentially closed system, in which the only metal-bearing input is feed 1. It will be recognized, in addition, that extra quantities of metal-bearing materials can be fed to the process at various points without departing from the spirit of this invention. For instance, additional acidic copper sulfate-nickel sulfate solution 3 can be fed to stage 2 in addition to the amount recycled from electrorefining stage 14. Also, amounts of copper and/or nickel, such as scrap including anode scrap, can be fed to smelting stage 12. In either event, the material balance around the whole system and the split between calcine positions 7 and 8 should be appropriately adjusted to ensure the production of high-quality copper from stage 14 and of a sufficiently purified nickel sulfate solution 4.

The process of the present invention thus effectively and comprehensively refines copper-nickel matte into product streams that contain the copper, nickel and precious metal values of interest in high yield and purity. As mentioned above, the ability of the present invention to produce high-quality products without having to trade off the purities of the various products against each other is not suggested by the prior art processes. In addition, the present process consumes significantly less energy and smaller amounts of reagents per unit of metal produced compared to previously employed processes, particularly in its use of electrorefining rather than electrowinning to produce copper.

The invention will be described in the following Example, which should be construed for purposes of illustration and not limitation.

EXAMPLE

The feed material was 1 kg of copper-nickel matte which assayed 41 wt. % Cu, 39 wt. % Ni, 17 wt. % S, 0.7 wt. % Fe, 0.34 wt. % Co, and very small amounts of precious metals.

The matte was ground to −325 mesh and then slurried in 3 liters of an aqueous solution assaying 25 gpl Cu, 50 gpl Ni, and 70 gpl $H_2SO_4$, at 90° C. for 4 hours until acidity had dropped to a pH of 4.0. The slurry was continually sparged with air.

The slurry was then filtered, providing 3 liters of a refined nickel sulfate solution assaying 90 gpl Ni, 1.4 gpl Cu, 0.68 gpl Co, and 0.007 gpl Fe, and 1052 g (dry weight) of a leach residue assaying 47 wt. % Cu, 25 wt. % Ni, 18 wt. % S, 0.6 wt. % Fe, 0.2 wt. % Co.

The leach residue was dried and then roasted in a muffle furnace at 750° C. to 850° C. to drive off sulfur. The resultant calcine contained only 0.001 wt. % S.

A portion of the calcine was leached in 4 liters of 100 gpl $H_2SO_4$ at 90° C. for 2 hours, thereby producing a copper sulfate solution assaying 59 gpl Cu, 0.75 gpl Ni, 0.04 gpl Fe, and 0.01 gpl Co. This solution was filtered from the residue, which was then combined with the remaining unleached calcine to form a mixture which was smelted with coke in a clay-graphite crucible at 1550° C. The smelted product was cast as a copper-nickel anode which had a mass of 730 g and assayed 50 wt. % Cu, 45.5 wt. % Ni, 0.88 wt. % Fe, and 0.45 wt. % Co.

The copper-nickel anode was electrolyzed opposite a copper starting sheet in an aqueous electrolyte solution comprised of 1.5 liters of the calcine leach liquor from above. Electrolysis was carried out at a cathode current density of 20 amps per sq. ft., at a temperature of 50° C. The resultant copper cathode deposit was of excellent physical quality and contained 72 g of copper assaying over 99 wt. % Cu. The end electrolyte contained 33 gpl Cu and 24 gpl Ni, and was suitable for recycling to leach additional copper-nickel matte. The final anode weight was 662 g.

An anode slime formed from the electrodeposition. The slime assayed 219 opt Ag, 10 opt Au, 46.6 opt Pt, and 10 opt Pd.

What is claimed is:

1. A process for refining a sulfur-containing, copper-containing concentrate, which also contains at least one metal less noble than copper, at least about 10 wt. % of which is in an acid-soluble form, and the (nickel plus cobalt) content of which is at least about 80 wt. %, comprising (a) providing a slurry of said concentrate in particulate form in a copper-containing sulfuric acid leaching solution,
(b) subjecting said slurry to a first stage leaching and refining step at atmospheric pressure and a temperature ranging from about 40° to about 95° C. to effect the simultaneous dissolution of metal less noble than copper and cementation of substantial amounts of copper from said solution,
(c) continuing said leaching to a terminal pH of over about 4 to refine said solution by further rejecting copper and impurities therefrom by hydrolysis and provide a purified sulfate solution of metal less noble than copper and a first stage atmospheric leach residue containing undissolved metal and sulfur compounds, and impurities,
(d) separating said purified sulfate solution from said first stage atmospheric leach residue for nickel recovery of said metal less moble than cooper,
(e) roasting the first stage atmospheric leach residue to form a calcine containing metal values in oxidic form and containing less than about 1 wt. % surfur,
(f) leaching at least a portion of the calcine with sulfuric acid to produce a second leach residue and a copper sulfate solution containing an amount of copper at least equal to the sum of the amount of copper in the solution withdrawn in step (k) plus an amount electrochemically equivalent to the total amount of metal less noble than cooper contained in the anode fromed in step (m),
(g) separating the copper sulfate solution formed in step (f) from the second leach residue,
(h) mixing together the second leach residue with any unleached portion of the calcine,
(i) smelting the mixture formed in step (h) to form a metallic alloy of copper and metal less noble than copper which comprises at least about 20 wt. % copper,
(j) casting the alloy formed in step (i) into an anode,
(k) establishing an electrolytic cell comprising the copper sulfate solution formed in step (g) having immersed therein the anode formed in step (j) and a cathrode,
(1) applying between the anode and the cathode in said electrolytic cell a votage effective to dissolve to anode and to preferentially deposit copper onto the cathode, whereby the copper sulfate solution becomes enriched in metal less noble than copper and depleted of copper,
(m) withdrawing said copper-depleted solution from the electrolytic cell whicle said solution contains sufficient copper that the cathodic copper deposit formed in step (1) comprises at least about 99% copper, and
(n) recycling said withdrawn copper-depleted solution to step (a).

2. The process of claim 1 wherein the feed material comprises copper-nickel matte.

3. The process of claim 2 wherein the ratio by weight of copper to (nickel plus cobalt) in the matte is at least about 0.5:1.

4. The process of claim 3 wherein the ratio by weight of copper to (nickel plus cobalt) in the matte is at least about 0.75:1.

5. The process of claim 1 or claim 2 wherein the purified sulfate solution recovered in step (d) contains less than about 2 gpl Cu.

6. The process of claim 1 or claim 2 wherein the solution recycled in step (k) contains at least about 15 gpl Cu.

7. The process of claim 3 wherein the solution recycled in step (k) contains at least about 15 gpl Cu.

8. The process of claim 1 wherein the cathodic copper deposit formed in step (1) comprises at least about 99.9% copper.

9. The process as described in claim 1 wherein the first stage leaching is conducted with aeration.

10. The process as described in claim 1 wherein leaching of the calcine is conducted with aeration.

* * * * *